United States Patent
Nam et al.

(10) Patent No.: US 12,401,547 B2
(45) Date of Patent: Aug. 26, 2025

(54) RADIO LINK MONITORING (RLM)/BEAM FAILURE DETECTION (BFD) REFERENCE SIGNAL (RS) FOR CORESETS WITH MULTIPLE ACTIVE TRANSMISSION CONFIGURATION INDICATOR (TCI) STATES

(71) Applicant: QUALCOMM Incorporated, San Diego, CA (US)

(72) Inventors: Wooseok Nam, San Diego, CA (US); Yan Zhou, San Diego, CA (US); Mostafa Khoshnevisan, San Diego, CA (US); Tao Luo, San Diego, CA (US); Konstantinos Dimou, New York City, NY (US); Iyab Issam Sakhnini, San Diego, CA (US); Sony Akkarakaran, Poway, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 478 days.

(21) Appl. No.: 17/904,097

(22) PCT Filed: Feb. 19, 2021

(86) PCT No.: PCT/US2021/018770
§ 371 (c)(1),
(2) Date: Aug. 11, 2022

(87) PCT Pub. No.: WO2021/168241
PCT Pub. Date: Aug. 26, 2021

(65) Prior Publication Data
US 2023/0080763 A1   Mar. 16, 2023

(30) Foreign Application Priority Data
Feb. 21, 2020   (GR) .............................. 20200100091

(51) Int. Cl.
*H04L 25/02*    (2006.01)
*H04B 7/06*    (2006.01)
*H04L 5/00*    (2006.01)

(52) U.S. Cl.
CPC ....... *H04L 25/0224* (2013.01); *H04B 7/0695* (2013.01); *H04L 5/0053* (2013.01)

(58) Field of Classification Search
CPC ... H04L 25/0224; H04L 25/02; H04L 5/0053; H04L 5/005; H04B 7/0695; H04B 7/069; H04W 72/0446; H04W 72/044
See application file for complete search history.

(56) References Cited

U.S. PATENT DOCUMENTS 10,666,334 B2 *  5/2020  Xiong ................... H04B 7/0695
2019/0281587 A1 *  9/2019  Zhang ................... H04W 72/23
(Continued)

FOREIGN PATENT DOCUMENTS

| CN | 110034874 A | 7/2019 |
| CN | 110312276 A | 10/2019 |
| WO | WO-2019137306 A1 | 7/2019 |

OTHER PUBLICATIONS

3GPP TS 38.213: "3rd Generation Partnership Project; Technical Specification Group Radio Access Network; NR; Physical Layer Procedures for Control (Release 15)", 3GPP Draft, 38213-F50, 3rd Generation Partnership Project (3GPP), Mobile Competence Centre, 650, Route Des Lucioles, F-06921 Sophia-Antipolis Cedex, France, vol. RAN WG1, No. V15.5.0 (Mar. 2019), Mar. 27, 2019 (Mar. 27, 2019), 104 Pages, XP051722950, XP051686992, Retrieved from the Internet: URL: http://www.3gpp.org/ftp/3guInternal/3GPP%5Fultimate%5Fversions%5Fto%5Fbe%5Ftransposed/sentToDpc/38213%2Df50%2Ezip [retrieved on Mar. 27, 2019] p. 12-p. 74, section 7.3.1.

(Continued)

*Primary Examiner* — Wei Zhao
(74) *Attorney, Agent, or Firm* — Norton Rose Fulbright LLP

(57) ABSTRACT

In some implementations, a method of wireless communication includes selecting, at a user equipment (UE), one or more control resource sets (CORESETs) from a plurality of CORESETs corresponding to the UE. At least one of the plurality of CORESETs corresponds to multiple active transmission configuration indicator (TCI) states. The method further includes performing a radio link monitoring (RLM) operation, a beam failure detection (BFD) operation, or both, based on one or more reference signals (RSs) corresponding to active TCI states associated with the one or more selected CORESETs.

20 Claims, 9 Drawing Sheets

(56) References Cited

U.S. PATENT DOCUMENTS

| | | | |
|---|---|---|---|
| 2019/0393980 A1 | 12/2019 | Lin et al. | |
| 2021/0050968 A1* | 2/2021 | Yi | H04L 5/0048 |
| 2021/0083833 A1 | 3/2021 | Zhou et al. | |
| 2021/0168779 A1* | 6/2021 | Mondal | H04L 5/0035 |

OTHER PUBLICATIONS

Huawei, et al., "Summary of Remaining Issues on Beam Failure Recovery", 3GPP TSG RAN WG1 Meeting #92bis, 3GPP Draft, R1-1803637, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, 13 Pages, Apr. 15, 2018 (Apr. 15, 2018), XP051425934, Retrieved from the Internet: URL: http://www.3gpp. org/ftp/Meetings%5F3GPP%5FSYNC/RAN1/Docs/ [retrieved on Apr. 15, 2018] p. 1-p. 3.

International Search Report and Written Opinion—PCT/US2021/018770—ISA/EPO—Jul. 30, 2021.

Mediatek Inc: "Summary 2 on Remaining Issues on Beam Failure Recovery", 3GPP TSG RAN WG1 Meeting #93, 3GPP Draft, 3GPP TSG RAN WG1 Meeting #93, R1-1807796_Summary_BFR_V07, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 24, 2018 (May 24, 2018), XP051463405, 29 Pages, Retrieved from the Internet: URL: http://www.3gpp.org/ftp/tsg%5Fran/WG1%5FRL1/TSGR1%5F93/Docs [retrieved on May 24, 2018] paragraph, p. 2-p. 6.

Nokia, et al., "Failure Detection Resources for BFR", 3GPP TSG RAN WG1 #96, 3GPP Draft, R1-1902561, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, 3 Pages, Feb. 16, 2019 (Feb. 16, 2019), XP051600255, Retrieved from the Internet: URL: http://www.3gpp.org/ftp/tsg%5Fran/WG1%5FRL1/TSGR1%5F96/Docs/R1%2D1902561%2Ezip [retrieved on Feb. 16, 2019] pp. 1, 3.

Partial International Search Report—PCT/US2021/018770—ISA/EPO—Jun. 9, 2021.

Qualcomm Incorporated: "Beam Management for NR", 3GPP TSG-RAN WG1 Meeting #94, 3GPP Draft, R1-1809711 Beam Management For NR, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 17, 2018 (Aug. 17, 2018), 16 Pages, XP051517061, Retrieved from the Internet: URL: http://www.3gpp.org/ftp/tsg%5Fran/WG1%5FRL1/TSGR1%5F94/Docs/R1%2D1809711%2Ezip [retrieved on Aug. 17, 2018], Sections 6, 9, 11 and 12, p. 4, "Text Proposal 38.214 Subclause 5.1.5:", Section 5, 7 and 20, pp. 1, 14.

* cited by examiner

RADIO LINK MONITORING (RLM)/BEAM FAILURE DETECTION (BFD) REFERENCE SIGNAL (RS) FOR CORESETS WITH MULTIPLE ACTIVE TRANSMISSION CONFIGURATION INDICATOR (TCI) STATES

CROSS-REFERENCE TO RELATED APPLICATIONS

This application claims the benefit of Greek Patent Application No. 20200100091, entitled, "RADIO LINK MONITORING (RLM)/BEAM FAILURE DETECTION (BFD) REFERENCE SIGNAL (RS) FOR CORESETS WITH MULTIPLE ACTIVE TRANSMISSION CONFIGURATION INDICATOR (TCI) STATES," filed on Feb. 21, 2020, which is expressly incorporated by reference herein in its entirety.

TECHNICAL FIELD

Aspects of the technology discussed below relate generally to wireless communication systems, and more particularly, to radio link monitoring and beam failure detection for CORESETs with multiple active transmission configuration indicator states.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME ASPECTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes selecting, at a user equipment (UE), one or more control resource sets (CORESETs) from a plurality of CORESETs corresponding to the UE. At least one of the plurality of CORESETs corresponds to multiple active transmission configuration indicator (TCI) states. The method further includes performing a radio link monitoring (RLM) operation, a beam failure detection (BFD) operation, or both, based on one or more reference signals (RSs) corresponding to active TCI states associated with the one or more selected CORESETs.

In an additional aspect of the disclosure, an apparatus configured for wireless communication is disclosed. The apparatus includes at least one processor, and a memory coupled to the at least one processor. The at least one processor is configured to select, at a user equipment (UE), one or more control resource sets (CORESETs) from a plurality of CORESETs corresponding to the UE. At least one of the plurality of CORESETs corresponds to multiple active transmission configuration indicator (TCI) states. The at least one processor is further configured to perform a radio link monitoring (RLM) operation, a beam failure detection (BFD) operation, or both, based on one or more reference signals (RSs) corresponding to active TCI states associated with the one or more selected CORESETs.

In an additional aspect of the disclosure, an apparatus configured for wireless communication is disclosed. The apparatus includes means for selecting, at a user equipment (UE), one or more control resource sets (CORESETs) from a plurality of CORESETs corresponding to the UE. At least one of the plurality of CORESETs corresponds to multiple active transmission configuration indicator (TCI) states. The apparatus further includes means for performing a radio link monitoring (RLM) operation, a beam failure detection (BFD) operation, or both, based on one or more reference signals (RSs) corresponding to active TCI states associated with the one or more selected CORESETs.

In an additional aspect of the disclosure, a non-transitory computer-readable medium stores instructions that, when executed by a processor, cause the processor to perform operations including selecting, at a user equipment (UE), one or more control resource sets (CORESETs) from a plurality of CORESETs corresponding to the UE. At least one of the plurality of CORESETs corresponds to multiple active transmission configuration indicator (TCI) states. The operations further include performing a radio link monitoring (RLM) operation, a beam failure detection (BFD) operation, or both, based on one or more reference signals (RSs) corresponding to active TCI states associated with the one or more selected CORESETs.

Other aspects, features, and embodiments will become apparent to those of ordinary skill in the art, upon reviewing the following description of specific, exemplary embodiments in conjunction with the accompanying figures. While features may be discussed relative to certain aspects and figures below, all aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffers, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
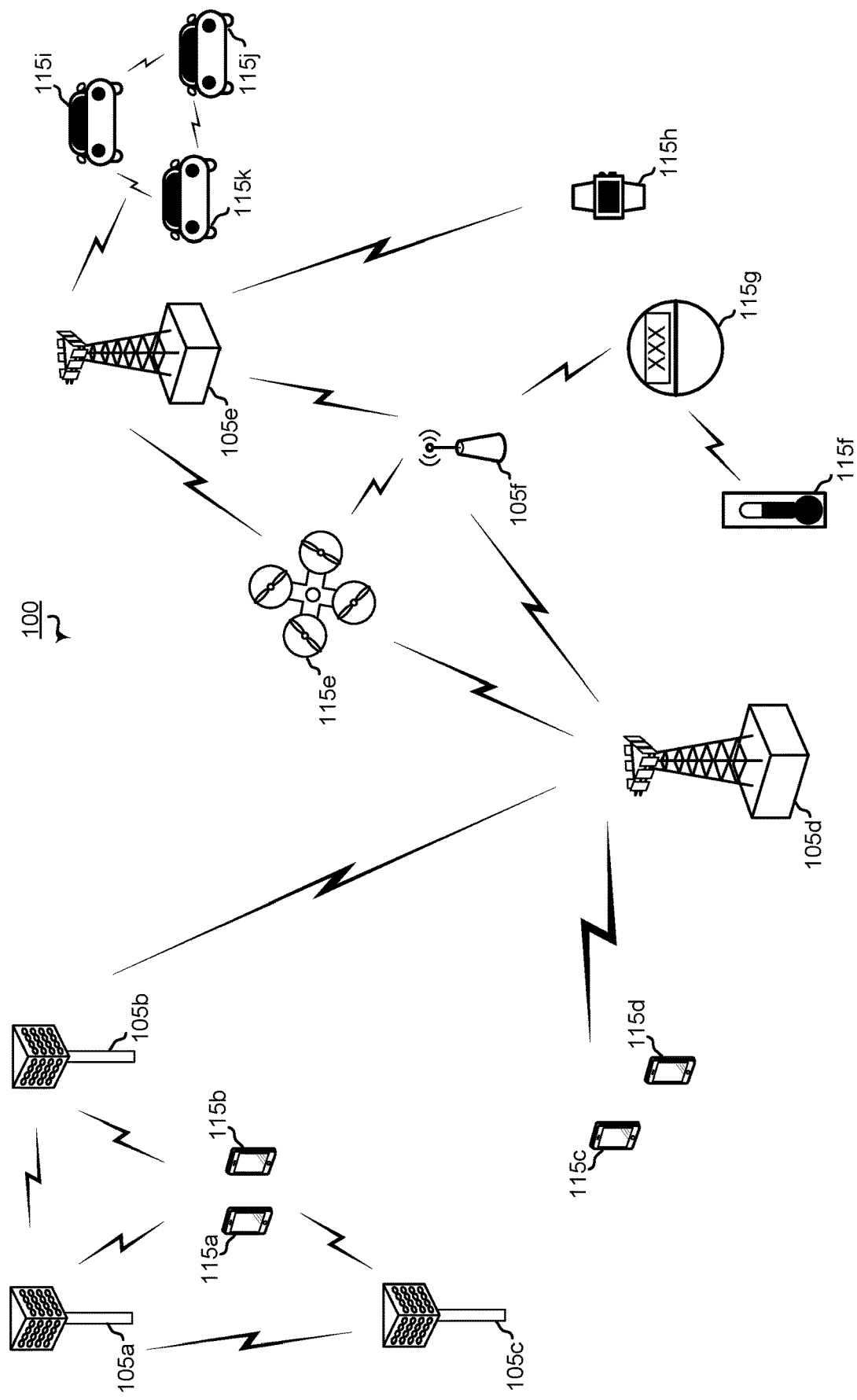
FIG. 1 is a block diagram illustrating details of a wireless communication system according to some aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, gaming devices, reality modification devices (e.g., extended reality (XR), augmented reality (AR), virtual reality (VR)), entertainment devices, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 may support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
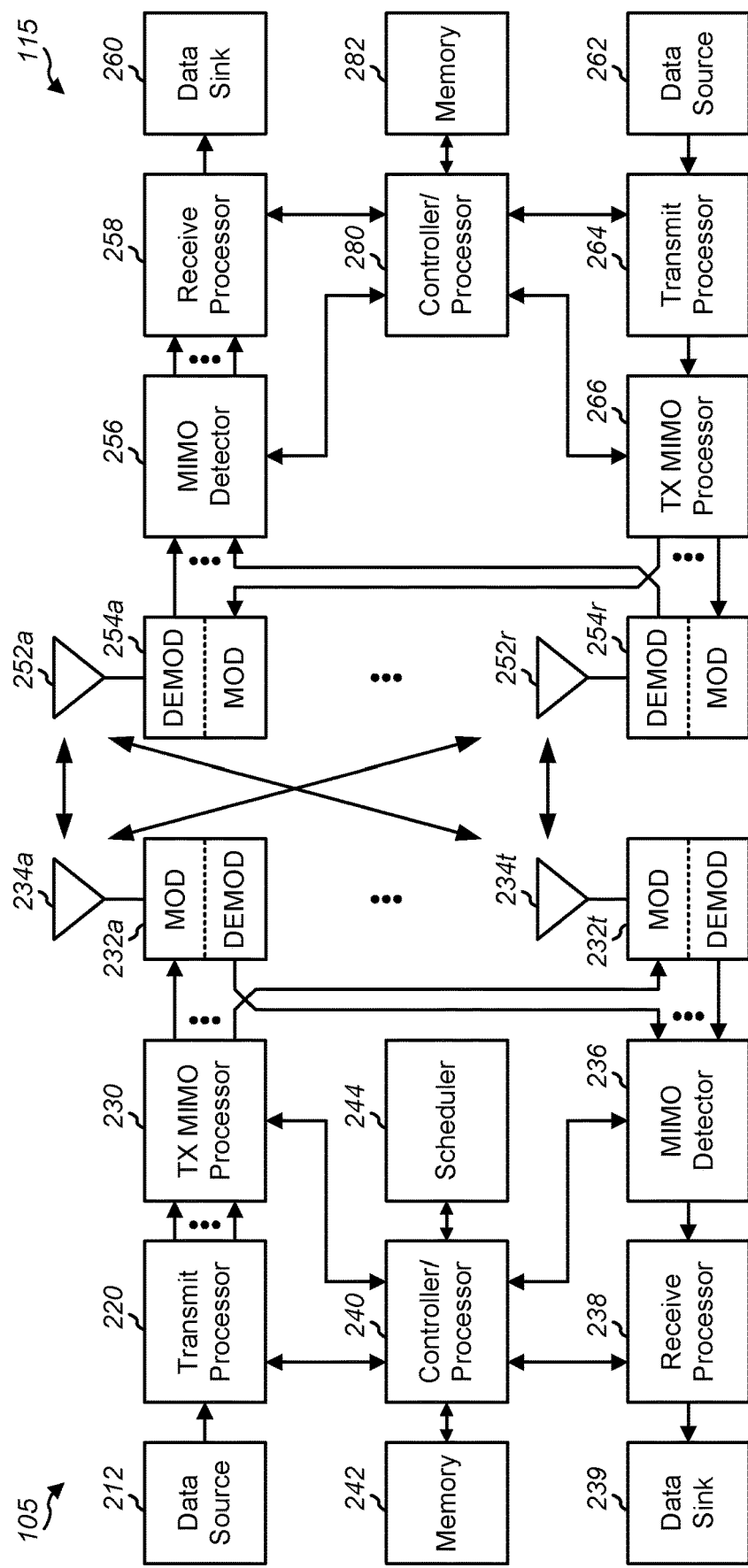
FIG. 2 is a block diagram conceptually illustrating a design of a base station and a UE configured according to some aspects.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIG. 8, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

One type of network supported in 5G NR is a single frequency network (SFN). In a SFN in NR, more than one transmission receive point (TRP)/panel transmits the same control signal(s) or data at the same time, on the same resource, with the same waveform/modulation/coding/scrambling. From a UE's point of view, this appears as a single transmission because the two transmissions combine over the air. There are at least two options for SFNs in NR. A first option is a transparent SFN, in which a transmission configuration indicator (TCI) state of a SFNed physical downlink shared channel (PDSCH) is based on a reference signal (RS), such as a channel state information (CSI) signal or a synchronization signal block (SSB), that is also SFNed. Quasi co-location (QCL) properties of the SFNed PDSCH may be derived based on the associated SFNed RS. The indicated TCI state determines the RS used to derive the QCL properties. A second option is a non-transparent SFN, in which the TCI state of a SFNed PDSCH is based on indication of two TCI states. QCL properties of the SFNed PDSCH may be derived based on the two indicated TCI states. For example, a UE may calculate a composite QCL relationship based on the two indicated TCI states.

A TCI state may be indicated in a scheduling downlink control information (DCI) (e.g., a physical downlink control channel (PDCCH)) for a UE to use in selecting a receive (Rx) beam. In order to support the non-transparent SFN option, more than one (e.g., two) TCI states need to be indicated. Indication of two TCI states is enabled in some versions of 5G standards (e.g., 3GPP standards), but for spatial division multiplexing (SDM)/frequency division multiplexing (FDM)/time division multiplexing (TDM) transmissions from multiple TRPs, not for SFN transmission. To illustrate, one TCI codepoint (e.g., three bits in scheduling DCI) may indicate one or two TCI states. When two TCI states are indicated, the PDSCH may be received based on SDM (e.g., different multiple-input multiple-output (MIMO) layers from different TRPs), FDM (e.g., different resource blocks (RBs)), or TDM (e.g., different symbols/slots). The same idea of two TCI states per one TCI codepoint may be applied to SFN, with additional indication added in the DCI or higher layer signaling to differentiate SFN and others (e.g., SDM/FDM/TDM). In some implementations, a single control resource set (CORESET) may have two active TCI states for SFN transmissions. For example, a PDCCH demodulation reference signal (DMRS) (1 port) is associated with two active TCI states. A media access control control element (MAC CE) for CORESET TCI state indication may be extended to indicate two TCI states at once. The PDCCH may be SFN transmitted if the DMRS port is associated with two TCI states.

Radio link monitoring (RLM) and beam failure detection (BFD) are important operations at a UE. RLM and BFD procedures maintain the link quality so that minimum required control channel decoding is guaranteed. Periodic CSI-RSs or SSBs, set by higher layer configuration, may be used by a UE to assess the radio link quality (e.g., perform RLM, BFD, or both). In NR higher layer configuration of RadioLinkMonitoringRS may be configured with purpose={beamFailure, rlf, both}, although this configuration is optional. If a UE is not explicitly configured with a set of CSI-RSs, SSBs, or both, for RLM and BFD, the UE uses CSI-RSs or SSBs that are quasi co-located with the DMRS associated with the CORESETs that the UE monitors for PDCCH reception (e.g., the same transmit (Tx) beam for CSI-RSs or SSBs as PDCCH). This corresponds to the CSI-RSs or SSBs provided by active TCI state associated with the CORESETs. The physical layer in the UE provides an indication (e.g., in a periodic manner for RLM and in an aperiodic manner for BFD) to higher layers when the radio link or beam quality for all corresponding resources that the UE uses to assess the radio link quality is worse than the threshold $Q_{out}$. In such situations, radio link failure is declared or a beam failure recovery procedure is initiated in response.

As described above, if a UE is not explicitly configured with resources for RLM and BFD, the UE determines the RSs for link quality assessment based on the active TCI states of configured CORESETs. If a CORESET has one active TCI state, and the TCI state has up to one RS with a spatial Rx parameter (e.g., a QCL-TypeD parameter), the UE may select the RSs indicated by the active TCI state of the CORESET. However, if the CORESET has two (or more) active TCI states, and thus the CORESET may have up to two RSs with the spatial Rx parameter, the UE may not be able to determine which RS to use for RLM/BFD performance.

The present disclosure provides systems, apparatus, methods, and computer-readable media for enabling RLM and BFD for CORESETs with multiple active TCI states. The present disclosure provides techniques for a UE to select one or more RSs for performing RLM and BFD operations when the UE corresponds to (e.g., is assigned) CORESETs that include or are associated with multiple active TCI states (e.g., instead of a single active TCI state). To illustrate, a UE may select one or more CORESETs from a plurality of CORESETs corresponding to (e.g., assigned to) the UE. At least one of the plurality of CORESETs correspond to multiple (e.g., at least two) active TCI states. The UE may also perform a RLM operation, a BFD operation, or both, based on one or more RSs corresponding to active TCI states associated with the one or more selected CORESETs. In some implementations, the UE may select a subset of CORESETs with a single active TCI state. In some other implementations, the UE may designate multiple virtual CORESETs based on a CORESET having two active TCI states. In some other implementations, the UE may prioritize the CORESETs and RSs based on various parameters for selecting one or more RSs used to perform the RLM operation, the BFD operation, or both. In some other implementations, the UE may perform the RLM operation, the BFD operation, or both on multiple different RSs and derive a combined metric for the CORESET. In this manner, a UE may select one or more RSs for performing RLM operations, BFD operations, or both for CORESETs having two active TCI states, which enables support of RLM and BFD operations for CORESETs having two active TCI states.

Figure 3:
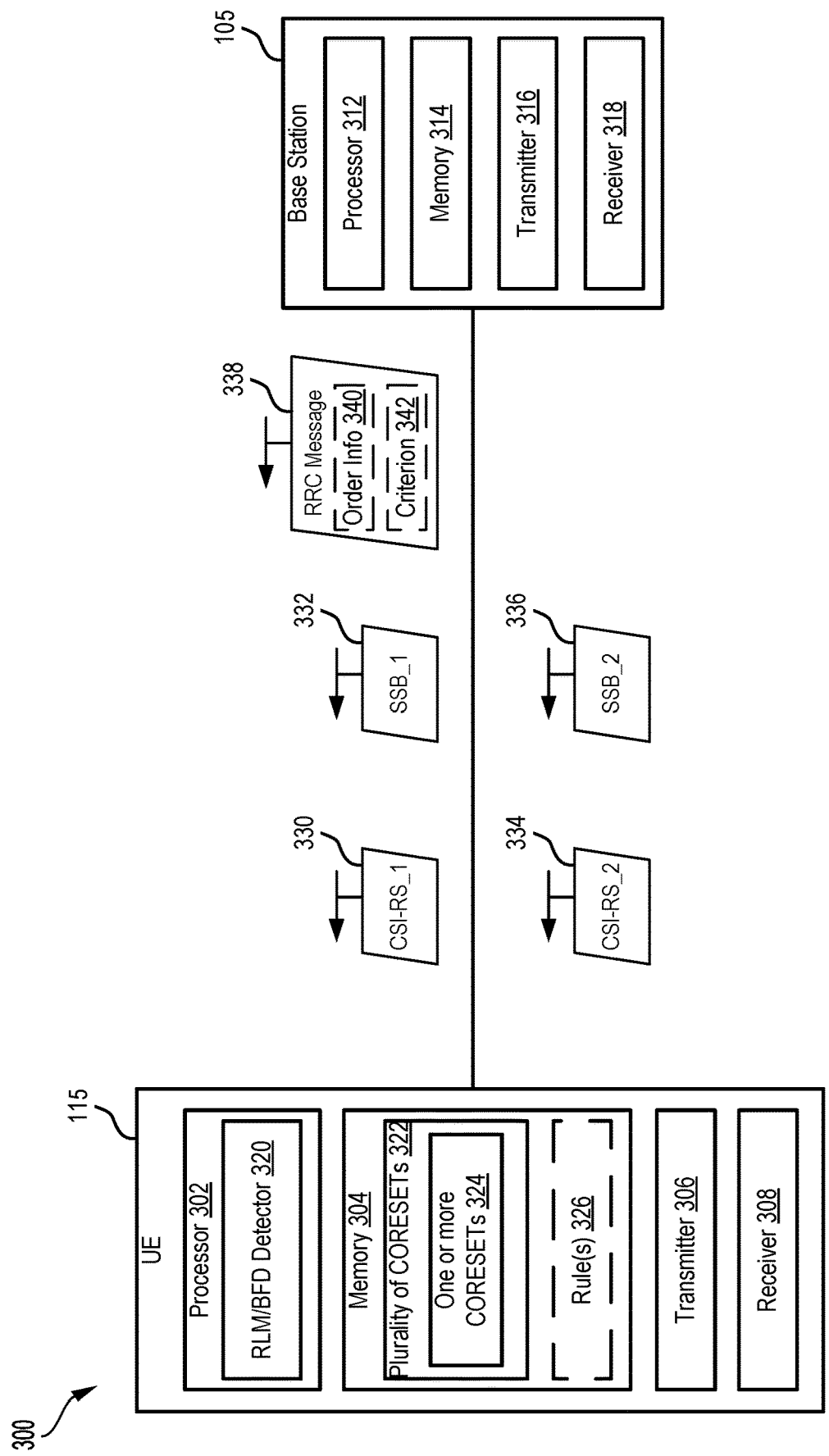
FIG. 3 is a block diagram of an example of a wireless communications system configured to enable radio link monitoring (RLM)/beam failure detection (BFD) for control resource sets (CORESETs) with multiple active transmission configuration indicator (TCI) states.

FIG. 3 is a block diagram of an example wireless communications system 300 configured to enable RLM/BFD for CORESETs with multiple active TCI states. In some examples, wireless communications system 300 may implement aspects of wireless network 100. Wireless communications system 300 includes UE 115 and base station 105. Although one UE and one base station are illustrated, in other implementations, wireless communications system 300 may include more than one UE, more than one base station, or both.

UE 115 may include a variety of components (e.g., structural, hardware components) used for carrying out one or more functions described herein. For example, these components may include a processor 302, a memory 304, a transmitter 306, and a receiver 308. Processor 302 may be configured to execute instructions stored at memory 304 to perform the operations described herein. In some implementations, processor 302 includes or corresponds to controller/processor 280, and memory 304 includes or corresponds to memory 282. In some implementations, processor 302 may include RLM/BFD detector 320 that is configured to perform RLM operations, BFD operations, or both on one or more RSs, as further described herein. Additionally, memory 304 may be configured to store plurality of CORESETs 322 that correspond to (e.g., are assigned or allocated to) UE 115. At least some of plurality of CORESETs 322 may correspond to multiple (e.g., at least two) active TCI states, as further described herein. As referred to herein, "storing" CORESETs 322 may refer to storing (e.g., temporarily) identifiers or indicators and parameters that correspond to the CORESETs 322 for use in selecting one or more of the CORESETs 322.

Transmitter 306 is configured to transmit data to one or more other devices, and receiver 308 is configured to receive data from one or more other devices. For example, transmitter 306 may transmit data, and receiver 308 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 306 and receiver 308 may be replaced with a transceiver. Additionally, or alternatively, transmitter 306, receiver 308, or both may include or correspond to one or more components of UE 115 described with reference to FIG. 2.

Base station 105 may include a variety of components (e.g., structural, hardware components) used for carrying out one or more functions described herein. For example, these components may include processor 312, memory 314, transmitter 316, and receiver 318. Processor 312 may be configured to execute instructions stored at memory 314 to perform the operations described herein. In some implementations, processor 312 includes or corresponds to controller/processor 240, and memory 314 includes or corresponds to memory 242.

Transmitter 316 is configured to transmit data to one or more other devices, and receiver 318 is configured to receive data from one or more other devices. For example, transmitter 316 may transmit data, and receiver 318 may receive data, via a network, such as a wired network, a wireless network, or a combination thereof. For example, base station 105 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 316 and receiver 318 may be replaced with a transceiver. Additionally, or alternatively, transmitter 316, receiver, 318, or both may include or correspond to one or more components of base station 105 described with reference to FIG. 2.

In a particular implementation, wireless communications system 300 be configured to implement a 5G network. For example, UE 115, base station 105, or both may be configured to operate in accordance with a 5G NR wireless communication standard specification, such as a specification promulgated by the IEEE.

During operation of wireless communications system 300, UE 115 may select one or more CORESETs 324 from plurality of CORESETs 322 corresponding to (e.g., assigned or allocated to) UE 115. For example, memory 304 may be configured to store indicators or identifiers and parameters corresponding to plurality of CORESETs 322, and RLM/BFD detector 320 (e.g., processor 302) may select one or more CORESETs 324 from among plurality of CORESETs 322. A CORESET is a set of physical resources and a set of parameters that are used to carry a physical downlink control channel (PDCCH)/downlink control information (DCI). A CORESET is similar to LTE PDCCH area, except that in LTE the PDCCH is always spread across the whole channel bandwidth, while in NR a CORESET region is localized to a specific region in the frequency domain. One or more CORESETs 324 may be selected for use in receiving downlink transmissions from base station 105 according to one or more options, as further described herein.

RLM/BFD detector 320 may perform a RLM operation, a BFD operation, or both, based on one or more RSs corresponding to active TCI states associated with one or more CORESETs 324. The one or more RSs may include one or more CSI-RSs, one or more SSBs, or both. For example, base station 105 may transmit one or more RSs to UE 115, such as first CSI-RS 330 (e.g., "CSI-RS_1"), first SSB 332 (e.g., "SSB_1"), second CSI-RS 334 (e.g., "CSI-RS_2"), and second SSB 336 (e.g., "SSB_2"), as non-limiting examples. UE 115 (e.g., RLM/BFD detector 320) may select one or more RSs of first CSI-RS 330, first SSB 332, second CSI-RS 334, and second SSB 336 that correspond to active TCI state(s) of one or more CORESETs 324 and perform a RLM operation, a BFD operation, or both, on the one or more selected RSs. Performing the RLM operation, the BFD operation, or both may maintain a link quality between UE 115 and base station 105 so that minimum required control channel decoding by UE 115 is guaranteed. For example, if first CSI-RS 330 corresponds to one or more CORESETs 324, UE 115 (e.g., RLM/BFD detector 320) may perform the RLM operation, the BFD operation, or both, based on first CSI-RS 330. Performing the RLM operation, the BFD operation, or both may include performing one or more signal measurements (e.g., a signal strength measurement or the like) with reference to first CSI-RS 330, decoding first CSI-RS 330, performing other operations, or a combination thereof. As another example, if second CSI-RS 334 and second SSB 336 correspond to one or more CORESETs 324, UE 115 (e.g., RLM/BFD detector 320) may perform RLM operations, BFD operations, or both based on second CSI-RS 334 and second SSB 336.

Figure 4:
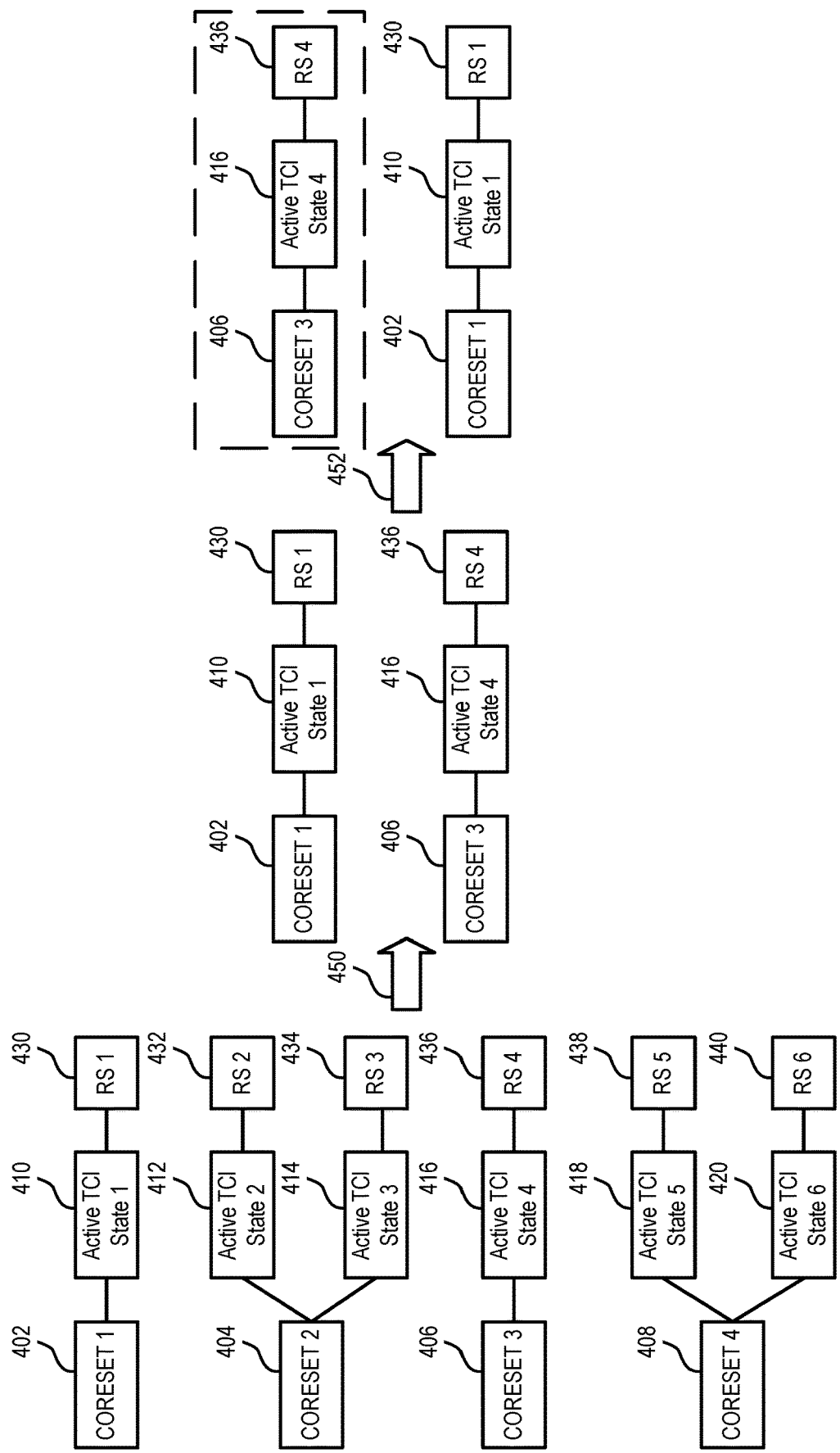
FIG. 4 is a first example of selecting one or more CORESETs for performing RLM/BFD at a UE.

In some implementations (e.g., a first option), UE 115 selects only CORESETs with single active TCI states. For example, if only a subset of plurality of CORESETs 322 include multiple active TCI states, one or more CORESETs 324 (e.g., the selected CORESETs) each correspond to a single active TCI state. FIG. 4 illustrates a first example of selecting one or more CORESETs for performing RLM/BFD at a UE (e.g., UE 115). In the example of FIG. 4, UE 115 may be allocated or assigned a plurality of CORESETs (e.g., plurality of CORESETs 322) that include first CORESET 402 (e.g., "CORESET 1"), second CORESET 404 (e.g., "CORESET 2"), third CORESET 406 (e.g., "CORESET 3"), and fourth CORESET 408 (e.g., "CORESET 4"). In other examples, plurality of CORESETs 322 may include less than four CORESETs or more than four CORESETs.

In the example of FIG. 4, some of the CORESETs 402-408 correspond to a single active TCI state, and some of the CORESETs 402-408 correspond to multiple (e.g., two) active TCI states. To illustrate, first CORESET 402 corresponds to first active TCI state 410 (e.g., "Active TCI State 1"), second CORESET 404 corresponds to second active TCI state 412 (e.g., "Active TCI state 2") and third active TCI state 414 (e.g., "Active TCI State 3"), third CORESET 406 corresponds to fourth active TCI state 416 (e.g., "Active TCI State 4"), and fourth CORESET 408 corresponds to fifth active TCI state 418 (e.g., "Active TCI State 5") and sixth active TCI state 420 (e.g., "Active TCI State 6"). Each active TCI state is associated with a respective RS. For example, first active TCI state 410 is associated with first RS 430 (e.g., "RS 1"), second active TCI state 412 is associated with second RS 432 (e.g., "RS 2"), third active TCI state 414 is associated with third RS 434 (e.g., "RS 3"), fourth active TCI state 416 is associated with fourth RS 436 (e.g., "RS 4"), fifth active TCI state 418 is associated with fifth RS 438 ("RS 5"), and sixth active TCI state 420 is associated with sixth RS 440 (e.g., "RS 6"). In some implementations, one or more of first RS 430, second RS 432, third RS 434, fourth RS 436, fifth RS 438, or sixth RS 440 include or correspond to one or more of first CSI-RS 330, first SSB 332, second CSI-RS 334, or second SSB 336 of FIG. 3.

In the example of FIG. 4, UE 115 selects the CORESETs that correspond to a respective single active TCI state. For example, at 450, UE 115 selects first CORESET 402 (corresponding to first active TCI state 410) and third CORESET 406 (corresponding to fourth active TCI state 416). Second CORESET 404 and fourth CORESET 408 are not selected because they correspond to two active TCI states. After selecting the CORESETs that correspond to a single active TCI state, UE 115 orders (e.g., prioritizes) the selected CORESETs at 452. The ordering may be based on one or more parameters or characteristics. After ordering the selected CORESETs, UE 115 selects the CORESET having the highest priority (e.g., that is ordered first) as one or more CORESETs 324 for use in performing the RLM operation, the BFD operation, or both. For example, UE 115 may select third CORESET 406 and perform the RLM operation, the BFD operation, or both based on fourth RS 436. Although described as selecting a single CORESET from the ordered list, in other implementations, UE 115 selects multiple CORESETs (e.g., the highest priority CORESETs from the list). The number of CORESETs selected may be based on a particular parameter, as further described herein.

In some implementations, UE 115 may order the selected CORESETs based on monitoring periodicity of search spaces for the plurality of CORESETs. For example, one or more CORESETs 324 may include a single CORESET having a search space with a shortest monitoring periodicity of search spaces of plurality of CORESETs 322 (or of CORESETs of plurality of CORESETs 322 that correspond to only a single active TCI state). To illustrate, third CORESET 406 may have a search space with a shorter monitoring periodicity than a search space of first CORESET 402. In some other implementations, UE 115 may order the selected CORESETs based on monitoring periodicity of search spaces of plurality of CORESETs 322 (or of CORESETs of plurality of CORESETs 322 that correspond to only a single active TCI state) and, if more than one CORESETs are associated with search spaces having the same monitoring periodicity, UE 115 may order the remaining CORESETs based on order of highest CORESET index. For example, one or more CORESETs 324 may include a single CORESET having a search space with a shortest monitoring periodicity of search spaces of plurality of CORESETs 322 and a highest CORESET index of plurality of CORESETs 322. To further illustrate, third CORESET 406 and first CORESET 402 may have search spaces with the same monitoring periodicity, but third CORESET 406 may have a higher CORESET index than first CORESET 402, and thus UE 115 selects third CORESET 406 as one or more CORESETs 324. In other implementations, the selected CORESETs may be ordered (e.g., prioritized) based on other parameters or characteristics.

Returning to FIG. 3, in some other implementations (e.g., a second option), UE 115 may select both CORESETs having a single active TCI state and CORESETs having multiple active TCI states as one or more CORESETs 324.

Figure 5:
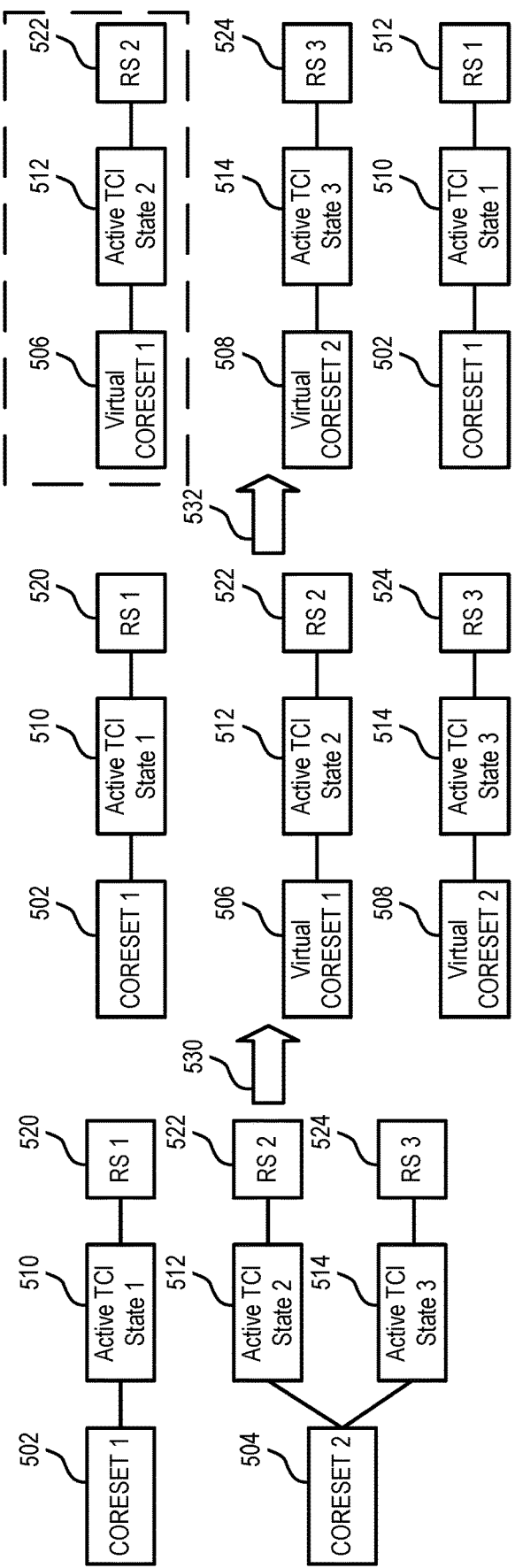
FIG. 5 is a second example of selecting one or more CORESETs for performing RLM/BFD at a UE.

Selecting CORESETs with multiple active TCI states may include designating virtual CORESETs having a single active TCI state. FIG. 5 illustrates a second example of selecting one or more CORESETs for performing RLM/BFD at a UE (e.g., UE 115). In the example of FIG. 5, UE 115 be assigned or allocated a plurality of CORESETs (e.g., plurality of CORESETs 322) that include first CORESET 502 (e.g., "CORESET 1") and second CORESET 504 (e.g., "CORESET 2"). In other examples, plurality of CORESETs 322 may include less than two CORESETs or more than two CORESETs.

In the example of FIG. 5, some of CORESETs 502-504 correspond to a single active TCI state, and some of CORESETs 502-504 correspond to multiple (e.g., two) active TCI states. To illustrate, first CORESET 502 corresponds to first active TCI state 510 (e.g., "Active TCI State 1"), and second CORESET 504 corresponds to second active TCI state 512 (e.g., "Active TCI state 2") and third active TCI state 514 (e.g., "Active TCI State 3"). Each active TCI state is associated with a RS. For example, first active TCI state 510 is associated with first RS 520 (e.g., "RS 1"), second active TCI state 512 is associated with second RS 522 (e.g., "RS 2"), and third active TCI state 514 is associated with third RS 524 (e.g., "RS 3"). In some implementations, one or more of first RS 520, second RS 522, or third RS 524 include or correspond to one or more of first CSI-RS 330, first SSB 332, second CSI-RS 334, or second SSB 336 of FIG. 3.

In the example of FIG. 5, UE 115 designates multiple virtual CORESETs for second CORESET 504, each virtual CORESET corresponding to a different active TCI state. For example, at 530, UE 115 designates first virtual CORESET 506 corresponding to second active TCI state 512 and second virtual CORESET 508 corresponding to third active TCI state 514. Thus, one or more CORESETs 324 include first CORESET 502, first virtual CORESET 506, second virtual CORESET 508, or a combination thereof.

After designating virtual CORESETs for CORESETs that correspond to two active TCI states, UE 115 orders (e.g., prioritizes) the CORESETs and the virtual CORESETs at 532. For example, UE 115 may order the CORESETs and the virtual CORESETs based on one or more parameters or characteristics. After ordering the CORESETs and the virtual CORESETs, UE 115 may select one or more of the CORESETs and the virtual CORESETs as one or more CORESETs 324 for use in performing the RLM operation, the BFD operation, or both. For example, UE 115 may perform the RLM operation, the BFD operation, or both, on RSs that correspond to the selected CORESETs and virtual CORESETs.

In some implementations, UE 115 selects all of the CORESETs and the virtual CORESETs as one or more CORESETs 324. Alternatively, if the maximum number of RLM RSs (e.g., $N_{RLM}$) is smaller (e.g., less) than the total number of CORESETs (both actual and virtual), UE 115 may select the $N_{RLM}$ RSs provided for active TCI states of the CORESETs based on the ordering. Thus, one or more CORESETs 324 may include up to a maximum number of RSs (e.g., $N_{RLM}$) defined in higher layer signaling. To further illustrate, when the maximum number of RSs is less than a number of CORESETs in plurality of CORESETs 322, UE 115 orders plurality of CORESETs 322 (e.g., at 532) and selects CORESETs corresponding to the maximum number of RSs with the highest ordering as one or more CORESETs 324. For example, UE 115 may order (e.g., prioritize) first virtual CORESET 506 first, second virtual CORESET 508 second, and first CORESET 502 third. If the maximum number of RSs (e.g., $N_{RLM}$) is one, UE 115 selects first virtual CORESET 506 as one or more CORESETs 324. If the maximum number of RSs is more than one, UE 115 selects more than one CORESET from the ordered list.

In some implementations, ordering the CORESETs (actual and virtual) includes ordering the CORESETs based on monitoring periodicities of corresponding search spaces. For example, the CORESET corresponding to the search space having the lowest monitoring periodicity may be ordered first, the CORESET corresponding to the search space having the second lowest monitoring periodicity may be ordered second, etc. In some implementations, ordering the CORESETs further includes ordering CORESETs (actual or virtual) corresponding to the same monitoring periodicity based on corresponding CORESET indices. For example, if two CORESETs correspond to search spaces having the same monitoring periodicity, the CORESET (actual or virtual) having the highest (e.g., greatest) CORESET index is ordered first. In some implementation, ordering the CORESETs further includes, for two virtual CORESETs having the same monitoring periodicities and the same CORESET index, ordering the two virtual CORESETs based on TCI state identifiers (IDs) corresponding to active TCI states of the two virtual CORESETs, RS types corresponding to RSs associated with the active TCI states of the two virtual CORESETs, or both. For example, if first virtual CORESET 506 and second virtual CORESET 508 both have the same monitoring periodicities and the same CORESET index, first virtual CORESET 506 and second virtual CORESET 508 may be ordered based on TCI state IDs corresponding to second active TCI state 512 and third active TCI state 514, respectively (e.g., the higher/greater TCI state ID is ordered first). As another example, if first virtual CORESET 506 and second virtual CORESET 508 have the same monitoring periodicities and the same CORESET index, first virtual CORESET 506 may be ordered before second virtual CORESET 508 based on second RS 522 being a CSI-RS and third RS 524 being a SSB (e.g., CSI-RSs may have a higher priority than SSBs). In other implementations, SSBs may have higher priority than CSI-RSs. The priority of the type of RS may be radio resource control (RRC) configured, as further described herein. In other implementations, the CORESETs (actual and virtual) may be ordered based on other parameters or characteristics.

Figure 6:
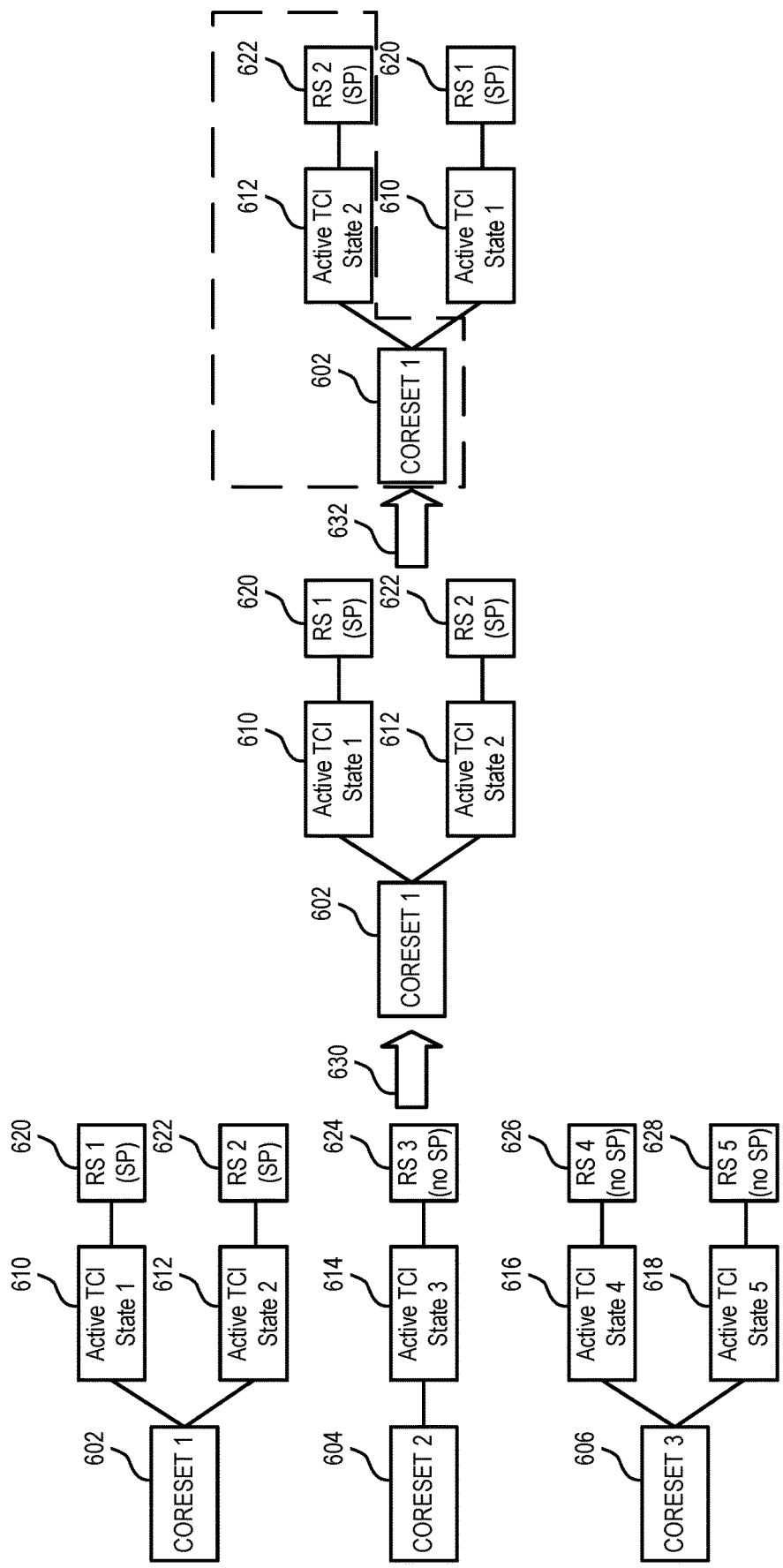
FIG. 6 is a third example of selecting one or more CORESETs for performing RLM/BFD at a UE.

Returning to FIG. 3, in some implementations (e.g., a third option), UE 115 selects a single RS of a CORESET corresponding to two active TCI states for performing the RLM operation, the BFD operation, or both. FIG. 6 illustrates a third example of selecting one or more CORESETs for performing RLM/BFD at a UE (e.g., UE 115). In the example of FIG. 6, UE 115 may be assigned or allocated a plurality of CORESETs (e.g., plurality of CORESETs 322) that include first CORESET 602 (e.g., "CORESET 1"), second CORESET 604 (e.g., "CORESET 2"), and third CORESET 606 (e.g., "CORESET 3"). In other examples, plurality of CORESETs 322 may include less than three CORESETs or more than three CORESETs.

In the example of FIG. 6, some of CORESETs 602-606 correspond to a single active TCI state, and some of CORESETs 602-606 correspond to multiple (e.g., two) active TCI states. To illustrate, first CORESET 602 corresponds to first active TCI state 610 (e.g., "Active TCI State 1") and second active TCI state 612 (e.g., "Active TCI State 2"), second CORESET 604 corresponds to third active TCI state 614 (e.g., "Active TCI State 3"), and third CORESET 606 corresponds to fourth active TCI state 616 (e.g., "Active TCI State 4") and fifth active TCI state 618 (e.g., "Active TCI State 5"). Each active TCI state is associated with a RS. For example, first active TCI state 610 is associated with first RS 620 (e.g., "RS 1"), second active TCI state 612 is associated with second RS 622 (e.g., "RS 2"), third active TCI state 614 is associated with third RS 624 (e.g., "RS 3"), fourth active TCI state 616 is associated with fourth RS 626 (e.g., "RS 4"), and fifth active TCI state 618 is associated with fifth RS 628 (e.g., "RS 5"). In some implementations, one or more of first RS 620, second RS 622, third RS 624, fourth RS 626, or fifth RS 628 include or correspond to one or more of first CSI-RS 330, first SSB 332, second CSI-RS 334, or second SSB 336 of FIG. 3.

UE 115 may select a CORESET having two active TCI states for use in performing the RLM operation, the BFD operation, or both. For example, at 630, UE 115 may select first CORESET 602. In some implementations, the plurality of CORESETs (e.g., plurality of CORESETs 322, including first CORESET 602, second CORESET 604, and third ORESET 606) may be ordered, as described above with reference to the second option, and the first ordered (e.g., highest priority) CORESET may be selected. Additionally, or alternatively, the CORESET used to receive the PDCCH may be selected. Thus, one or more CORESETs 324 may include first CORESET 602 corresponding to first active TCI state 610 and second active TCI state 612.

In some implementations, UE 115 may select a RS to use in performing the RLM operation, the BFD operation, or both, based on spatial Rx parameters of the RSs corresponding to the active TCI states of the selected CORESET. For example, if first CORESET 602 is the selected CORESET, and only one of the RSs has a spatial Rx parameter, the RS having the spatial Rx parameter may be selected for use in performing the RLM operation, the BFD operation, or both. In some implementations, the spatial Rx parameter is a QCL-TypeD parameter, as defined in one or more wireless communication standards. If both RSs corresponding to the active TCI states of the selected CORESET have the spatial Rx parameter, UE 115 selects the RS based on other parameters or characteristics, as further described herein.

To illustrate, in the example of FIG. 6, some RSs have a spatial Rx parameter, and other RSs do not have a spatial Rx parameter. For example, first RS 620 and second RS 622 have the spatial Rx parameter (as indicated by "(SP)"), and third RS 624, fourth RS 626, and fifth RS 628 do not have the spatial Rx parameter (as indicated by "(no SP)"). Thus, when first CORESET 602 is selected, both RSs (e.g., first RS 620 and second RS 622) associated with the corresponding active TCI states (e.g., first active TCI state 610 and second active TCI state 612) have the spatial Rx parameter. Because both RSs have the spatial Rx parameter, the RS that is selected is based on additional parameters or characteristics. For example, UE 115 may order, at 632, the active TCI states and associated RSs based on the parameters or characteristics, and UE 115 may select the active TCI state and associated RS that are the highest ordered (e.g., prioritized). In the example of FIG. 6, the highest prioritized active TCI state and RS are second active TCI state 612 and second RS 622.

In some implementations, when first RS 620 and second RS 622 have spatial Rx parameters, the one or more RSs are selected from first RS 620 and second RS 622 based on RS types of first RS 620 and second RS 622. The RS types may include CSI-RSs and SSBs. For example, the RS of first RS 620 and second RS 622 that is a CSI-RS may be selected. Alternatively, the RS of first RS 620 and second RS 622 that is a SSB may be selected. A selected RS type may be RRC configurable. For example, base station 105 may transmit RRC message 338 to UE 115. RRC message 338 may include order information 340 that may indicate which RS type (e.g., CSI-RS or SSB) to prioritize. For example, UE 115 may select second RS 622 based on second RS 622 having the RS type indicated by order information 340.

In some implementations, when first RS 620 and second RS 622 have the same RS type, UE 115 selects the one or more RSs from first RS 620 and second RS 622 based on an order of periodicities of first RS 620 and second RS 622. The order of periodicities may correspond to either increasing or decreasing order. For example, UE 115 may select the RS having the smallest (e.g., least) periodicity. Alternatively, UE 115 may select the RS having the largest (e.g., greatest) periodicity. In some implementations, a selected order of periodicities is RRC configurable. For example, base station 105 may transmit RRC message 338 to UE 115. RRC message 338 may include order information 340 that may indicate which order of periodicities (e.g., increasing or decreasing) to prioritize. For example, UE 115 may select second RS 622 based on second RS 622 having the periodicity indicated by order information 340.

In some implementations, when first RS 620 and second RS 622 have the same periodicity, UE 115 selects the one or more RSs from first RS 620 and second RS 622 based on an order of TCI state indices. The order of TCI state indices may correspond to either an increasing or a decreasing order. For example, UE 115 may select the RS corresponding to the active TCI state with the smallest (e.g., least) TCI state index. Alternatively, UE 115 may select the RS corresponding to the active TCI state with the largest (e.g., greatest) TCI state index. In some implementations, a selected order of TCI state indices is RRC configurable. For example, base station 105 may transmit RRC message 338 to UE 115. RRC message 338 may include order information 340 that may indicate with order of TCI state indices (e.g., increasing or decreasing) to prioritize. For example, UE 115 may select second RS 622 based on second active TCI state 612 having the TCI state index indicated by order information 340.

In some implementations, when first RS 620 and second RS 622 have the same periodicity, UE 115 selects the one or more RSs from first RS 620 and second RS 622 based on an order of RS resource indices. The order of RS resource indices may include an order of CSI-RS indices, an order of SSB indices, or both. The order of RS resource indices may correspond to either an increasing or decreasing order. For example, UE 115 may select the RS having the smallest (e.g., least) CSI-RS index or SSB index. Alternatively, UE 115 may select the RS having the largest (e.g., greatest) CSI-RS index or SSB index. In some implementations, a selected order of the RS resource indices (and a type of the RS resource indices) is RRC configurable. For example, base station 105 may transmit RRC message 338 to UE 115. RRC message 338 may include order information 340 that may indicate with order of RS resource indices (e.g., increasing or decreasing) to prioritize, a type of RS resource indices (e.g., CSI-RS indices or SSB indices) to prioritize, or both. For example, UE 115 may select second RS 622 based on second RS 622 having a RS resource index type and index indicated by order information 340. Although ordering has been described above using a particular order of parameters/characteristics, in other implementations, other parameters/characteristics may be used to order the RSs first. For example, instead of ordering by RS type first, UE 115 may order RSs by periodicity of RSs first, and RS type second. Other examples are also contemplated. In other implementations, UE 115 may order the RSs based on other parameters or characteristics.

Figure 7:
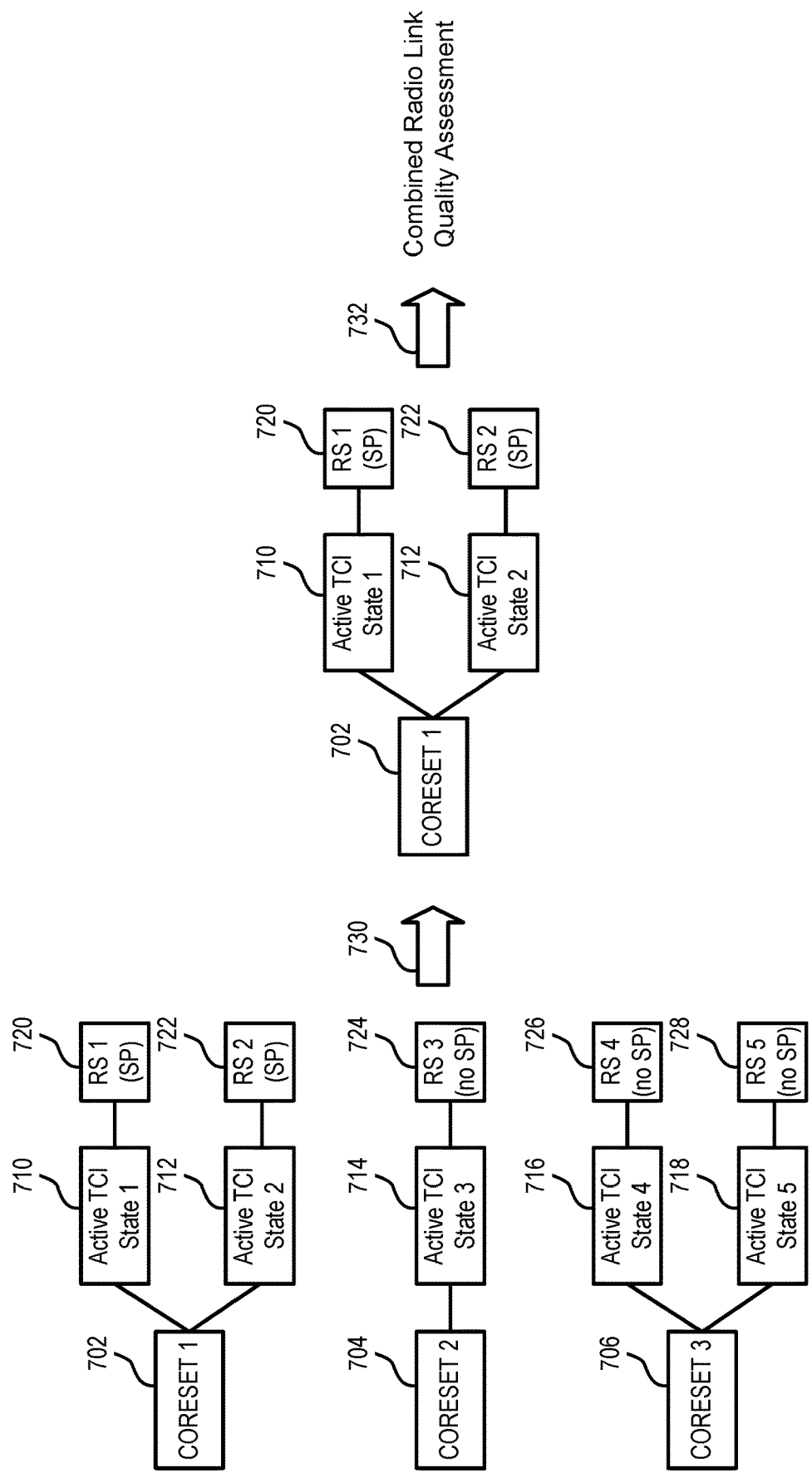
FIG. 7 is a fourth example of selecting one or more CORESETs for performing RLM/BFD at a UE.

Returning to FIG. 3, in some implementations (e.g., a fourth option), UE 115 may select multiple RSs from a CORESET corresponding to multiple active TCI states and perform a RLM operation, a BFD operation, or both, based on the multiple RSs to determine a combined radio link quality assessment. FIG. 7 illustrates a fourth example of selecting one or more CORESETs for performing RLM/BFD at a UE (e.g., UE 115). In the example of FIG. 7, UE 115 may be assigned or allocated a plurality of CORESETs (e.g., plurality of CORESETs 322) that include first CORESET 702 (e.g., "CORESET 1"), second CORESET 704 (e.g., "CORESET 2"), and third CORESET 706 (e.g., "CORESET 3"). In other examples, plurality of CORESETs 322 may include less than three CORESETs or more than three CORESETs.

In the example of FIG. 7, some of CORESETs 702-706 correspond to a single active TCI state, and some of CORESETs 702-706 correspond to multiple (e.g., two) active TCI states. To illustrate, first CORESET 702 corresponds to first active TCI state 710 (e.g., "Active TCI State 1") and second active TCI state 712 (e.g., "Active TCI State 2"), second CORESET 704 corresponds to third active TCI state 714 (e.g., "Active TCI State 3"), and third CORESET 706 corresponds to fourth active TCI state 716 (e.g., "Active TCI State 4") and fifth active TCI state 718 (e.g., "Active TCI State 5"). Each active TCI state is associated with a RS. For example, first active TCI state 710 is associated with first RS 720 (e.g., "RS 1"), second active TCI state 712 is associated with second RS 722 (e.g., "RS 2"), third active TCI state 714 is associated with third RS 724 (e.g., "RS 3"), fourth active TCI state 716 is associated with fourth RS 726 (e.g., "RS 4"), and fifth active TCI state 718 is associated with fifth RS 728 (e.g., "RS 5"). In some implementations, one or more of first RS 720, second RS 722, third RS 724, fourth RS 726, or fifth RS 728 may include or correspond to one or more of first CSI-RS 330, first SSB 332, second CSI-RS 334, or second SSB 336 of FIG. 3.

UE 115 may select a CORESET having two active TCI states for use in performing the RLM operation, the BFD operation, or both. For example, at 730, UE 115 may select first CORESET 702. In some implementations, the plurality of CORESETs (e.g., plurality of CORESETs 322, including first CORESET 702, second CORESET 704, and third CORESET 706) may be ordered, as described above with reference to the second option, and the first ordered (e.g., highest priority) CORESET may be selected. Additionally, or alternatively, the CORESET used to receive the PDCCH may be selected. Thus, one or more CORESETs 324 may include first CORESET 702 corresponding to first active TCI state 710 and second active TCI state 712.

In the example of FIG. 7, UE 115 may use first RS 720 and second RS 722 in performing the RLM and BFD operations. For example, UE 115 may perform a first RLM operation, a first BFD operation, or both based on first RS 720 (corresponding to first active TCI state 710) to generate a first assessment of radio link quality, and UE 115 may perform a second RLM operation, a second BFD operation, or both based on second RS 722 (corresponding to second active TCI state 712) to generate a second assessment of radio link quality. In some implementations, the assessments of radio link quality may include or correspond to a block error rate (BLER) or a reference signal received power (RSRP). After determining the first assessment of radio link quality and the second assessment of radio link quality, UE 115 determines, at 732, a combined radio link quality assessment.

In some implementations, after determining the first assessment of radio link quality and the second assessment of radio link quality, UE 115 selects either the first assessment of radio link quality or the second assessment of radio link quality as a combined metric for the CORESET (e.g., first CORESET 702). The combined metric for the CORESET may be based on a selection criterion. For example, the selection criterion may indicate whether the lowest (e.g., least) or the highest (e.g., greatest) assessment of radio link quality is selected as the combined metric for the CORESET. In some implementations, the selection criterion is RRC configurable. For example, base station 105 may transmit RRC message 338 to UE 115. RRC message 338 may include criterion 342 that indicates whether the lowest (e.g., least) or highest (e.g., greatest) assessment of radio link quality is selected as the combined metric for the CORESET.

In some other implementations, UE 115 may determine the combined radio link quality assessment based on both the first assessment of radio link quality and the second assessment of radio link quality. For example, UE 115 may compute an average assessment of radio link quality based on the first assessment of radio link quality and the second assessment of radio link quality. In some implementations, the average is an arithmetic average. In some other implementations, the average is a geometric average. In some other implementations, the average is a harmonic average.

In some other implementations, UE 115 may determine a CSI-RS (or SSB) resource associated with two TCI states (e.g., CSI-RS for SFN transmission), and if the pair of TCI states coincides with the one associated with the CORESET, UE 115 may use the CSI-RS for link quality assessment. For example, one or more CORESETs 324 may include a single CORESET corresponding to two or more active TCI states. The one or more RSs used by UE 115 to perform the RLM operation, the BFD operation, or both, include a RS that is associated with the same two or more active TCI states as the single CORESET. Thus, if UE 115 determines a single RS (e.g., a CSI-RS or a SSB) associated with two or more active TCI states of a single CORESET, the single RS may be used for link quality assessment.

Returning to FIG. 3, UE 115 may select one or more CORESETs 324 based on a criterion. The criterion may be RRC configurable. For example, base station 105 may transmit RRC message 338 to UE 115. RRC message 338 may include or indicate criterion 342. Criterion 342 may indicate which option UE 115 is to use in selecting one or more CORESETs 324 (e.g., the first option, the second option, the third option, or the fourth option). Alternatively, criterion 342 may indicate details of selecting one or more CORESETs 324 based on aspects of the options. For example, criterion 342 may indicate that, in the fourth option, if two active TCI states are used for SFN transmission of the PDSCH, the maximum (or minimum) link quality assessment should be used for the combined metric for the CORESET, but if the two active TCI states are used for SDM/FDM/TDM transmission of the PDSCH, the average of the first link quality assessment and the second link quality assessment should be used as the combined metric for the CORESET. In some other implementations, the selection of one or more CORESETs 324 is based on one or more rules that are preconfigured at UE 115 prior to deployment. For example, memory 304 may be configured to store rules 326. Rules 326 may indicate which option to use in determining one or more CORESETs 324, or which aspects of the options are to be used, similar to criterion 342.

Thus, FIG. 3 describes wireless communications system 300 that enables UE 115 to select RSs for performing RLM/BFD operations for CORESETs that correspond to two active TCI states. For example, UE 115 may select one or more CORESETs that correspond to UE 115 and may use the RSs associated with active TCI states of the one or more CORESETs in performing RLM operations, BFD operations, or both. In this manner, link quality assessments may be performed for CORESETs that have multiple active TCI states, such as CORESETs used to enable a SFN.

Figure 8:
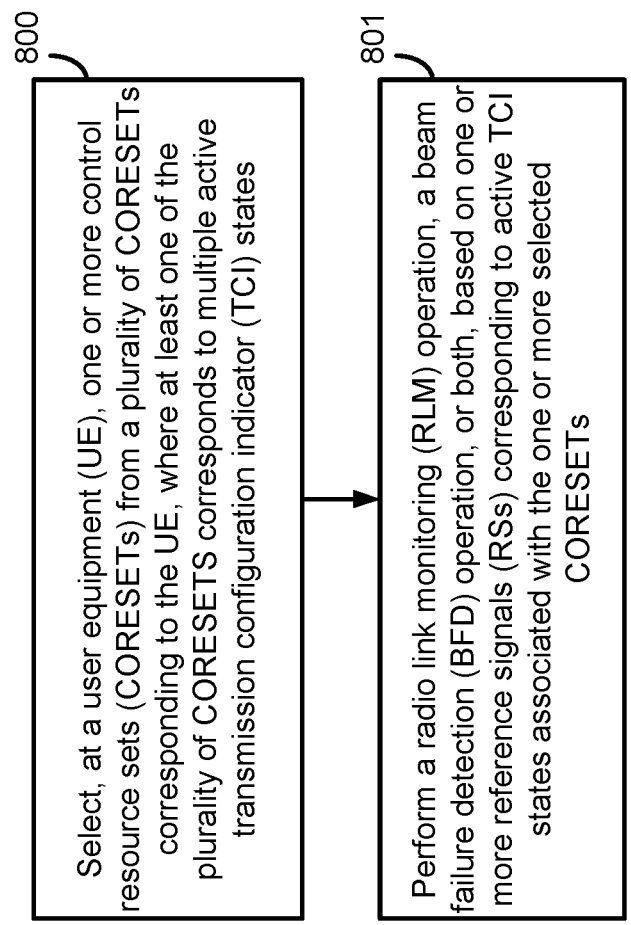
FIG. 8 is a flow diagram of an example of a method for selecting one or more CORESETs for performing RLM/BFD according to some aspects.
Figure 9:
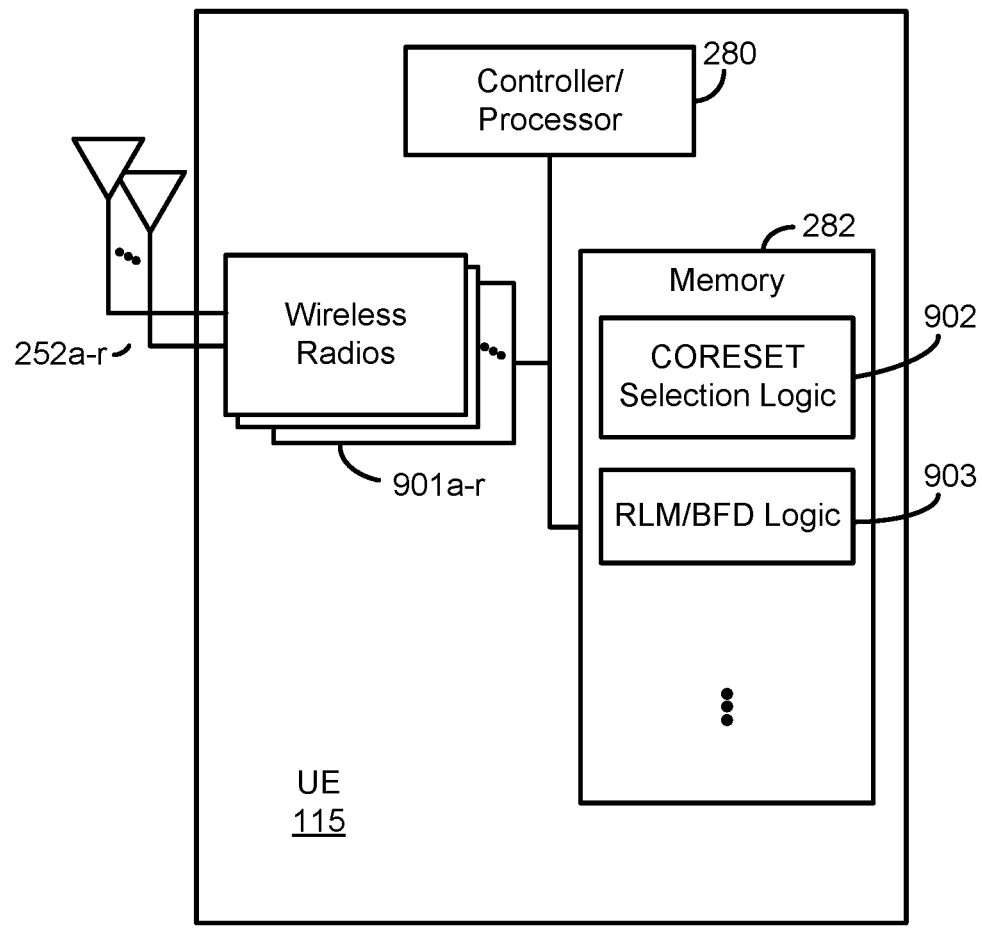
FIG. 9 is a block diagram conceptually illustrating a design of a UE configured to select one or more CORESETs for performing RLM/BFD according to some aspects.

FIG. 8 is a flow diagram illustrating example blocks executed to implement one aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 901a-r and antennas 252a-r. Wireless radios 901a-r includes various components and hardware, as illustrated in FIG. 2 for UE 115, including modulator/demodulators 254a-r, MIMO detector 256, receive processor 258, transmit processor 264, and TX MIMO processor 266.

At block 800, the UE selects one or more CORESETs from a plurality of CORESETs corresponding to the UE. At least one of the plurality of CORESETs corresponds to two active TCI states. The UE 115 may execute, under control of controller/processor 280, CORESET selection logic 902 stored in memory 282. The execution environment of CORESET selection logic 902 provides the functionality to select one or more CORESETs from a plurality of CORESETs corresponding to UE 115. At least one of the plurality of CORESETs corresponds to two active TCI states.

At block 801, the UE performs a RLM operation, a BFD operation, or both, based on one or more RSs corresponding to active TCI states associated with the one or more CORESETs. The UE 115 may execute, under control of controller/processor 280, RLM/BFD logic 903 stored in memory 282. The execution environment of RLM/BFD logic 903 provides the functionality to perform a RLM operation, a BFD operation, or both, based on one or more RSs corresponding to active TCI states associated with the one or more CORESETs.

Enabling techniques for RLM and/or BFD for CORESETs with multiple active TCI states may include additional aspects, such as any single aspect or any combination of aspects described below and/or in connection with one or more other processes described elsewhere herein. In such aspects, a UE may include at least one processor and a memory coupled to the at least one processor. The at least one processor may be configured to select, at a UE, one or more CORESETs from a plurality of CORESETs corresponding to the UE. At least one of the plurality of CORESETs corresponds to multiple active TCI states. The at least one processor may be further configured to perform a RLM operation, a BFD operation, or both, based on one or more RSs corresponding to active TCI states associated with the one or more CORESETs. In other implementations, a non-transitory computer-readable medium may store instructions that, when executed by a processor (of a UE) cause the processor to perform the operations described herein.

In a first aspect, the one or more RSs include one or more channel state information reference signals (CSI-RSs), one or more synchronization signal blocks (SSBs), or both.

In a second aspect, alone or in combination with the first aspect, the one or more CORESETs each correspond to a single active TCI state.

In a third aspect, alone or in combination with the second aspect, the one or more CORESETs include a single CORESET having a search space with a shortest monitoring periodicity of search spaces of the plurality of CORESETs.

In a fourth aspect, alone or in combination with the second aspect, the one or more CORESETs include a single CORESET having a search space with a shortest monitoring periodicity of search spaces of the plurality of CORESETs and a highest CORESET index of the plurality of CORESETs.

In a fifth aspect, alone or in combination with one or more of the first through fourth aspects, the plurality of CORESETs includes a first CORESET corresponding to a first active TCI state and a second CORESET corresponding to a second active TCI state and a third active TCI state, and the UE designates a first virtual CORESET corresponding to the second active TCI state and a second virtual CORESET corresponding to the third active TCI state.

In a sixth aspect, alone or in combination with the fifth aspect, the one or more selected CORESETs include the first CORESET, the first virtual CORESET, the second virtual CORESET, or a combination thereof.

In a seventh aspect, alone or in combination with the sixth aspect, the one or more selected CORESETs include up to a maximum number of RSs defined in higher layer signaling.

In an eighth aspect, alone or in combination with the seventh aspect, the UE, when the maximum number of RSs is less than a number of CORESETs in the plurality of CORESETs, orders the plurality of CORESETs and selects CORESETs corresponding to the maximum number of RSs with the highest ordering as the one or more selected CORESETs.

In a ninth aspect, alone or in combination with the eighth aspect, ordering the plurality of CORESETs includes ordering the plurality of CORESETs based on monitoring periodicities of corresponding search spaces.

In a tenth aspect, alone or in combination with the ninth aspect, ordering the plurality of CORESETs further includes ordering CORESETs corresponding to the same monitoring periodicity based on corresponding CORESET indices.

In an eleventh aspect, alone or in combination with the tenth aspect, ordering the plurality of CORESETs further includes, for two virtual CORESETs having the same CORESET index, ordering the two virtual CORESETs based on TCI state identifiers (IDs) corresponding to active TCI states of the two virtual CORESETs, RS types corresponding to RSs associated with the active TCI states of the two virtual CORESETs, or both.

In a twelfth aspect, alone or in combination with one or more of the first through eleventh aspects, the one or more selected CORESETs includes a CORESET corresponding to a first active TCI state and a second active TCI state.

In a thirteenth aspect, alone or in combination with the twelfth aspect, the first active TCI state corresponds to a first RS having a spatial receiver (Rx) parameter, the second active TCI state corresponds to a second RS having no spatial Rx parameter, and the one or more RSs include the first RS and not the second RS.

In a fourteenth aspect, alone or in combination with the twelfth aspect, the first active TCI state corresponds to a first RS having a first spatial receiver (Rx) parameter, the second active TCI state corresponds to a second RS having a second spatial RX parameter, and the one or more RSs are selected from the first RS and the second RS based on RS types of the first RS and the second RS.

In a fifteenth aspect, alone or in combination with the fourteenth aspect, the RS types include channel state information reference signals (CSI-RSs) and synchronization signal blocks (SSBs), and a selected RS type is radio resource control (RRC) configurable.

In a sixteenth aspect, alone or in combination with one or more of the fourteenth through fifteenth aspects, when the first RS and the second RS have the same RS type, the one or more RSs are selected from the first RS and the second RS based on an order of periodicities of the first RS and the second RS.

In a seventeenth aspect, alone or in combination with the sixteenth aspect, the order of periodicities corresponds to either increasing or decreasing order, and a selected order of periodicities is radio resource control (RRC) configurable.

In an eighteenth aspect, alone or in combination with one or more of the sixteenth through seventeenth aspects, when the first RS and the second RS have the same periodicity, the one or more RSs are selected from the first RS and the second RS based on an order of TCI state indices.

In a nineteenth aspect, alone or in combination with the eighteenth aspect, the order of TCI state indices corresponds to either increasing or decreasing order, and a selected order of TCI state indices is radio resource control (RRC) configurable.

In a twentieth aspect, alone or in combination with the sixteenth aspect, when the first RS and the second RS have the same periodicity, the one or more RSs are selected from the first RS and the second RS based on an order of RS resource indices.

In a twenty-first aspect, alone or in combination with the twentieth aspect, the order of RS resource indices includes an order of channel state information resource signal (CSI-RS) indices, an order of synchronization signal block (SSB) indices, or both, and a selected order of RS resource indices is radio resource control (RRC) configurable.

In a twenty-second aspect, alone or in combination with one or more of the twelfth through twenty-first aspects, performing the RLM operation, the BFD operation, or both includes performing a first RLM operation, a first BFD operation, or both based on a first RS corresponding to the first active TCI state to generate a first assessment of radio link quality and performing a second RLM operation, a second BFD operation, or both based on a second RS corresponding to the second active TCI state to generate a second assessment of radio link quality.

In a twenty-third aspect, alone or in combination with the twenty-second aspect, the UE selects the first assessment of radio link quality or the second assessment of radio link quality based on a selection criterion.

In a twenty-fourth aspect, alone or in combination with the twenty-third aspect, the selection criterion is radio resource control (RRC) configurable.

In a twenty-fifth aspect, alone or in combination with the twenty-second aspect, the UE computes an average assessment of radio link quality based on the first assessment of radio link quality and the second assessment of radio link quality.

In a twenty-sixth aspect, alone or in combination with the twenty-fifth aspect, computing the average assessment of radio link quality includes calculating an arithmetic average, calculating a geometric average, or calculating a harmonic average.

In a twenty-seventh aspect, alone or in combination with one or more of the first through twenty-sixth aspects, the selected one or more CORESETs include a single CORESET corresponding to two or more active TCI states, and the one or more RSs include a RS that is associated with the same two or more active TCI states as the single CORESET.

In a twenty-eighth aspect, alone or in combination with one of more of the first through twenty-seventh aspects, selecting the one or more CORESETs is based on a criterion that is radio resource control (RRC) configurable.

In a twenty-ninth aspect, alone or in combination with one or more of the first through twenty-eighth aspects, selecting the one or more CORESETs is based on a rule that is preconfigured at the UE prior to deployment.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to FIGS. 1-9 may be implemented via specialized processor circuitry, via executable instructions, and/or combinations thereof.

Those of skill would further appreciate that the various illustrative logical blocks, modules, circuits, and algorithm steps (e.g., the logical blocks in FIG. 8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
   selecting, at a user equipment (UE), one or more control resource sets (CORESETs) from a plurality of CORESETs corresponding to the UE, wherein at least one of the plurality of CORESETs corresponds to multiple active transmission configuration indicator (TCI) states; and
   performing a radio link monitoring (RLM) operation, a beam failure detection (BFD) operation, or both, based on one or more reference signals (RSs) corresponding to active TCI states associated with the one or more selected CORESETs;
   wherein the plurality of CORESETs includes a first CORESET corresponding to a first active TCI state and a second CORESET corresponding to a second active TCI state and a third active TCI state, and further comprising designating a first virtual CORESET corresponding to the second active TCI state and a second virtual CORESET corresponding to the third active TCI state.

2. The method of claim 1, wherein the one or more RSs comprise one or more channel state information reference signals (CSI-RSs), one or more synchronization signal blocks (SSBs), or both.

3. The method of claim 1, wherein the one or more CORESETs each correspond to a single active TCI state.

4. The method of claim 3, wherein the one or more CORESETs include a single CORESET having a search space with a shortest monitoring periodicity of search spaces of the plurality of CORESETs.

5. The method of claim 3, wherein the one or more CORESETs include a single CORESET having a search space with a shortest monitoring periodicity of search spaces of the plurality of CORESETs and a highest CORESET index of the plurality of CORESETs.

6. The method of claim 1, wherein the one or more selected CORESETs include the first CORESET, the first virtual CORESET, the second virtual CORESET, or a combination thereof.

7. The method of claim 6, wherein the one or more selected CORESETS include up to a maximum number of RSs defined in higher layer signaling.

8. The method of claim 7, further comprising, when the maximum number of RSs is less than a number of CORESETs in the plurality of CORESETs, ordering the plurality of CORESETs and selecting CORESETs corresponding to the maximum number of RSs with the highest ordering as the one or more selected CORESETs.

9. The method of claim 8, wherein ordering the plurality of CORESETs comprises ordering the plurality of CORESETs based on monitoring periodicities of corresponding search spaces.

10. The method of claim 9, wherein ordering the plurality of CORESETS further comprises ordering CORESETs corresponding to the same monitoring periodicity based on corresponding CORESET indices.

11. The method of claim 10, wherein ordering the plurality of CORESETs further comprises, for two virtual CORESETs having the same CORESET index, ordering the two virtual CORESETs based on TCI state identifiers (IDs)

corresponding to active TCI states of the two virtual CORESETs, RS types corresponding to RSs associated with the active TCI states of the two virtual CORESETs, or both.

12. An apparatus configured for wireless communication, the apparatus comprising:
    at least one processor; and
    a memory coupled to the at least one processor,
    wherein the at least one processor is configured to:
        select, at a user equipment (UE), one or more control resource sets (CORESETs) from a plurality of CORESETs corresponding to the UE, wherein at least one of the plurality of CORESETs corresponds to multiple active transmission configuration indicator (TCI) states; and
        perform a radio link monitoring (RLM) operation, a beam failure detection (BFD) operation, or both, based on one or more reference signals (RSs) corresponding to active TCI states associated with the one or more selected CORESETs;
    wherein the plurality of CORESETs includes a first CORESET corresponding to a first active TCI state and a second CORESET corresponding to a second active TCI state and a third active TCI state, and further comprising designating a first virtual CORESET corresponding to the second active TCI state and a second virtual CORESET corresponding to the third active TCI state.

13. An apparatus configured for wireless communication, the apparatus comprising:
    means for selecting, at a user equipment (UE), one or more control resource sets (CORESETs) from a plurality of CORESETs corresponding to the UE, wherein at least one of the plurality of CORESETs corresponds to multiple active transmission configuration indicator (TCI) states; and
    means for performing a radio link monitoring (RLM) operation, a beam failure detection (BFD) operation, or both, based on one or more reference signals (RSs) corresponding to active TCI states associated with the one or more selected CORESETs;
    wherein the plurality of CORESETs includes a first CORESET corresponding to a first active TCI state and a second CORESET corresponding to a second active TCI state and a third active TCI state, and further comprising designating a first virtual CORESET corresponding to the second active TCI state and a second virtual CORESET corresponding to the third active TCI state.

14. A non-transitory computer-readable medium storing instructions that, when executed by a processor, cause the processor to perform operations comprising:
    selecting, at a user equipment (UE), one or more control resource sets (CORESETs) from a plurality of CORESETs corresponding to the UE, wherein at least one of the plurality of CORESETs corresponds to multiple active transmission configuration indicator (TCI) states; and
    performing a radio link monitoring (RLM) operation, a beam failure detection (BFD) operation, or both, based on one or more reference signals (RSs) corresponding to active TCI states associated with the one or more selected CORESETs;
    wherein the plurality of CORESETs includes a first CORESET corresponding to a first active TCI state and a second CORESET corresponding to a second active TCI state and a third active TCI state, and further comprising designating a first virtual CORESET corresponding to the second active TCI state and a second virtual CORESET corresponding to the third active TCI state.

15. The apparatus of claim 12, wherein the one or more selected CORESETs include the first CORESET, the first virtual CORESET, the second virtual CORESET, or a combination thereof.

16. The apparatus of claim 15, wherein the one or more selected CORESETS include up to a maximum number of RSs defined in higher layer signaling.

17. The apparatus of claim 16, wherein, when the maximum number of RSs is less than a number of CORESETs in the plurality of CORESETs, ordering the plurality of CORESETs and selecting CORESETs corresponding to the maximum number of RSs with the highest ordering as the one or more selected CORESETs.

18. The apparatus of claim 17, wherein ordering the plurality of CORESETs comprises ordering the plurality of CORESETs based on monitoring periodicities of corresponding search spaces.

19. The apparatus of claim 18, wherein ordering the plurality of CORESETS further comprises ordering CORESETs corresponding to the same monitoring periodicity based on corresponding CORESET indices.

20. The apparatus of claim 19, wherein ordering the plurality of CORESETs further comprises, for two virtual CORESETs having the same CORESET index, ordering the two virtual CORESETs based on TCI state identifiers (IDs) corresponding to active TCI states of the two virtual CORESETs, RS types corresponding to RSs associated with the active TCI states of the two virtual CORESETs, or both.

* * * * *